United States Patent [19]
Moise

[11] 3,714,729
[45] Feb. 6, 1973

[54] FISH HARVESTING METHOD AND APPARATUS

[76] Inventor: John R. Moise, 115 Central Avenue, Houma, La. 70360

[22] Filed: Feb. 9, 1971

[21] Appl. No.: 113,871

[52] U.S. Cl.....................................43/4.5, 43/17.1
[51] Int. Cl..............................................A01k 79/00
[58] Field of Search......................43/4.5, 17.1, 8, 6.5

[56] References Cited

UNITED STATES PATENTS

| | | | |
|---|---|---|---|
| 1,980,452 | 11/1934 | Tice et al. | 43/4.5 |
| 3,112,575 | 12/1963 | Lewis et al. | 43/8 |
| 2,818,672 | 1/1958 | Kreutzer | 43/17.1 |

FOREIGN PATENTS OR APPLICATIONS 188,208  5/1967  U.S.S.R..............................43/17.1

Primary Examiner—Warner H. Camp
Attorney—Clarence A. O'Brien and Harvey B. Jacobson

[57] ABSTRACT

Fish and other marine life are harvested by establishing electric field barriers in a body of water enclosing a relatively large volume that is contracted toward a central collection zone with which the fish are concentrated. The electric fields are formed between flexible electrodes suspended from floats that are moved toward the collection zone by cables extending from a frame mounted at the collection zone.

7 Claims, 5 Drawing Figures

John R. Moise
INVENTOR.

John R. Moise
INVENTOR.

FISH HARVESTING METHOD AND APPARATUS

This invention relates to the harvesting of fish, crayfish, shrimp and other such marine animals that inhabit bodies of water. More particularly, the present invention relates to an electro-fishing method and apparatus.

Harvesting of fish by use of electrodes in order to establish electric field barriers within a body of water, is well known. Such electro-fishing methods and apparatus are, however, limited as to surface area or volume enclosed by the electric field barriers. Such prior methods and apparatus therefore are restricted by size and association with other equipment such as purse seine nets to the harvesting of particular types of fish or to certain locations. It is therefore an important object of the present invention to provide a more versatile method and apparatus for the commercial harvesting of fish or the like in man-made impoundments, and natural occurring bodies of water as well as in the open waters of oceans, bays, etc.

In accordance with the present invention, a frame assembly supported on the bottom of a shallow depth impoundment to harvest catfish or crayfish or supported from the deck of a fishing vessel in deep water installations, establishes a collection zone into which fish or other marine animals may be concentrated. A plurality of floats are tied to the frame by cables for movement from positions remotely spaced from the collection zone toward guide posts outlining the collection zone. Flexible electrode chains are suspended from the floats and supplied with electrical energy by conductors extending through the cables. Electric field barriers are thereby established between electrodes of opposite polarity in order to enclose a relatively large volume of water. By movement of the electrodes toward the central collection zone, the volume enclosed by the electric field barriers is gradually reduced in size so as to concentrate all of the fish within the collection zone from which they may be removed by conventional methods. By use of flexible electrode chains, the volume enclosed by the electric field barriers may be of variable depth. Also, the source of voltage may be regulated in order to maintain a substantially constant current flow between the electrodes as they are being moved toward the central collection zone. The voltage is initially set at a proper level for constraining desired animal life within the enclosed volume without injury thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
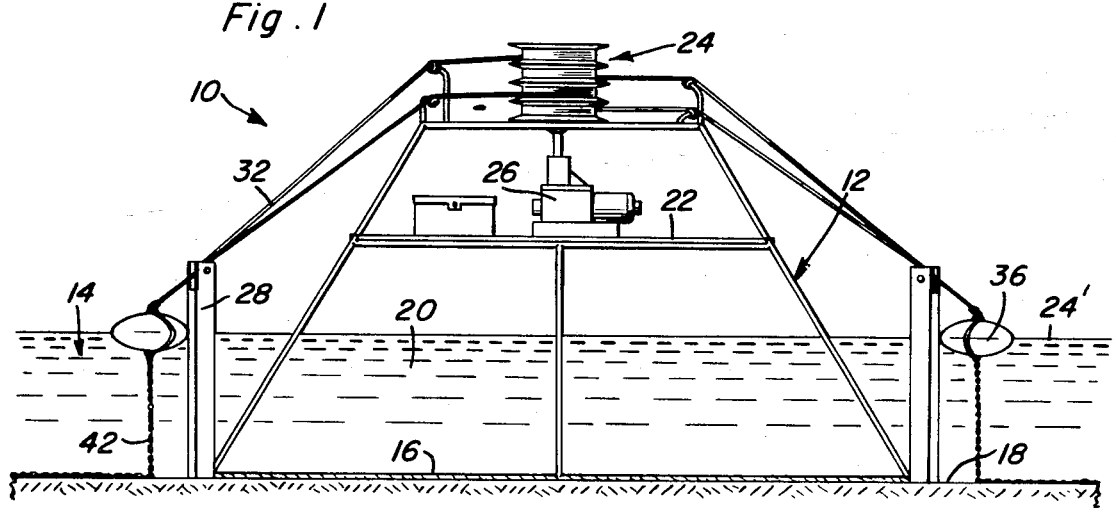
FIG. 1 is a side elevational view of the apparatus associated with the present invention.

Referring to the drawings in detail, FIG. 1 illustrates the apparatus of the present invention generally denoted by reference numeral 10. The apparatus includes a frame assembly generally referred to by reference numeral 12 submerged within a body of water 14. In the illustrated embodiment, the frame assembly includes a bottom member 16 resting on the floor or bottom 18. A collection zone 20 is thus established above the bottom member 16 of the frame assembly within which the fish is to be concentrated and from which the fish may be removed by conventional methods. The frame assembly as shown also includes a platform 22 located above the surface 24' of the water in order to mount power equipment including a motor driven winch mechanism 24 and an automatically regulated source of electrical energy 26 of any suitable type. Further, the collection zone 20 is outlined by a plurality of spaced vertical guide posts 28 connected to and forming part of the frame assembly.

Figure 4:
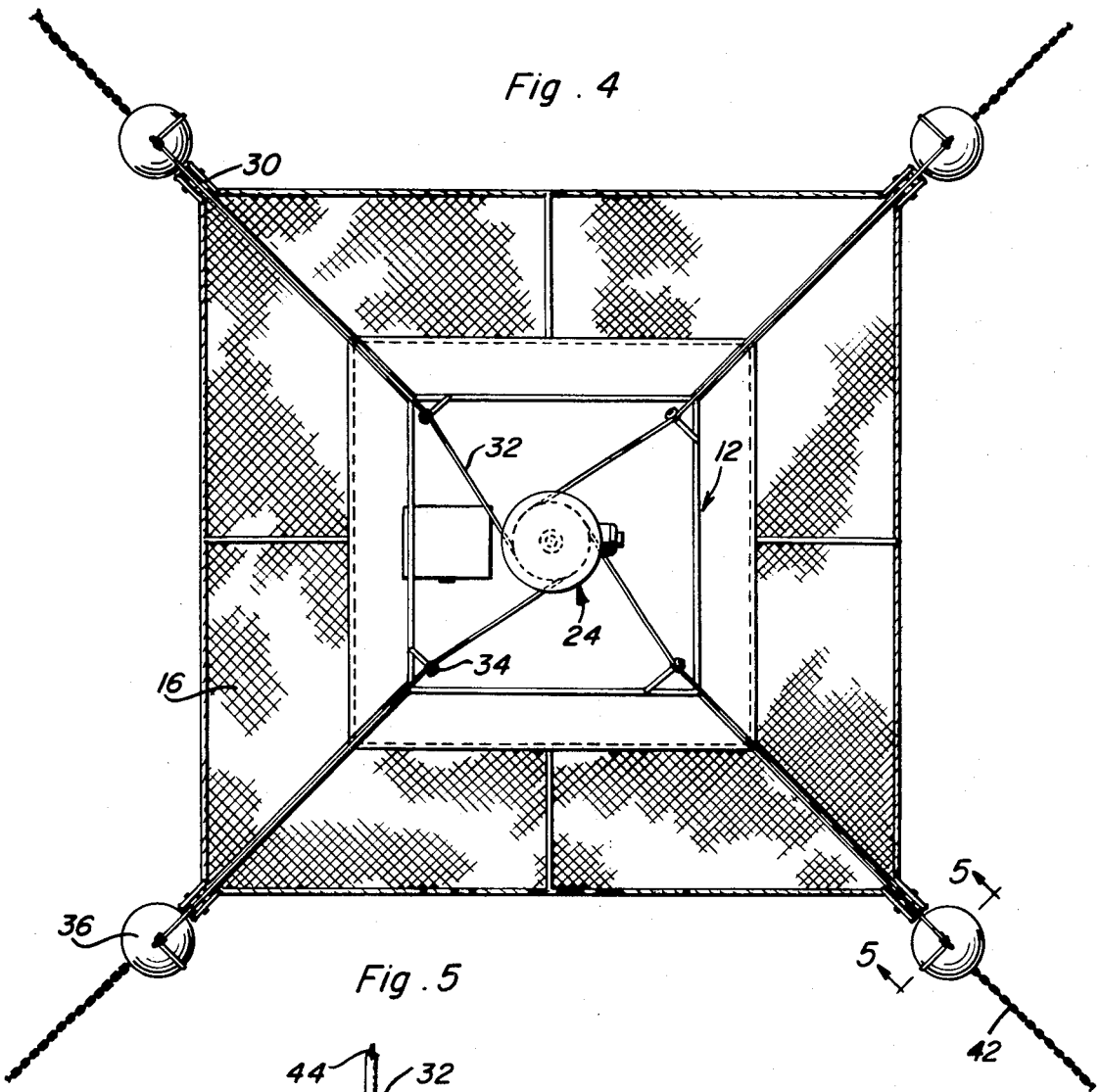
FIG. 4 is an enlarged top plan view of the apparatus associated with the present invention.

As more clearly seen in FIG. 4, each of the guide posts mounts a guide pulley 30 over which a cable 32 passes. Each of the cables is anchored to a sheave of the winch device 24 and extends tangentially therefrom over the guide pulleys 34 toward the guide pulleys 30 atop the vertical guide posts 28 which form the corners of a polygon outlining the collection zone 20 at the surface 24' of the body of water 14. Although four such guide posts are shown in the illustrated embodiment, it will be appreciated that any other number of guide posts may be utilized in order to form a corresponding configuration.

Figure 5:
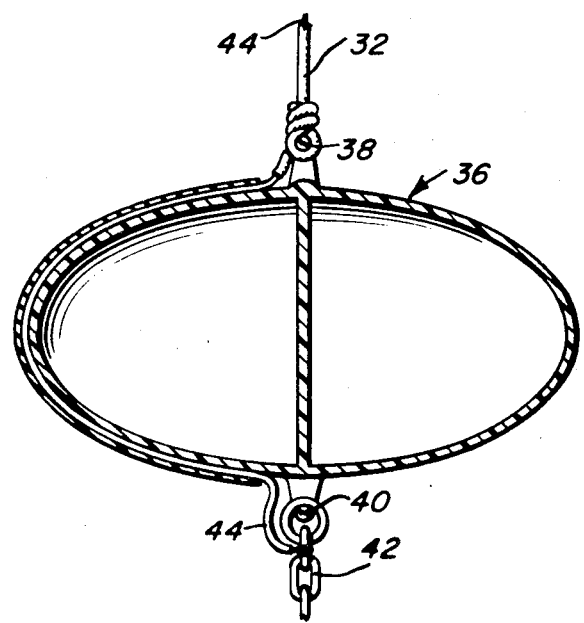
FIG. 5 is an enlarged partial sectional view taken substantially through the plane indicated section line 5—5 in FIG. 4.

Each of the cables 32 extends radially from the corner guide posts 28 to an associated float 36. The float may be of any type as for example a hollow buoyant shell as shown in FIG. 5. The cable 32 is secured to the anchor formation 38 on top of the float opposite to the bottom anchor formation 40 from which a flexible electrode chain 42 is suspended. An electrical conductor 44 extends through the cable 32 and is electrically connected to the upper end of the flexible electrode chain 42 in order to supply electrical energy thereto.

Figure 2:
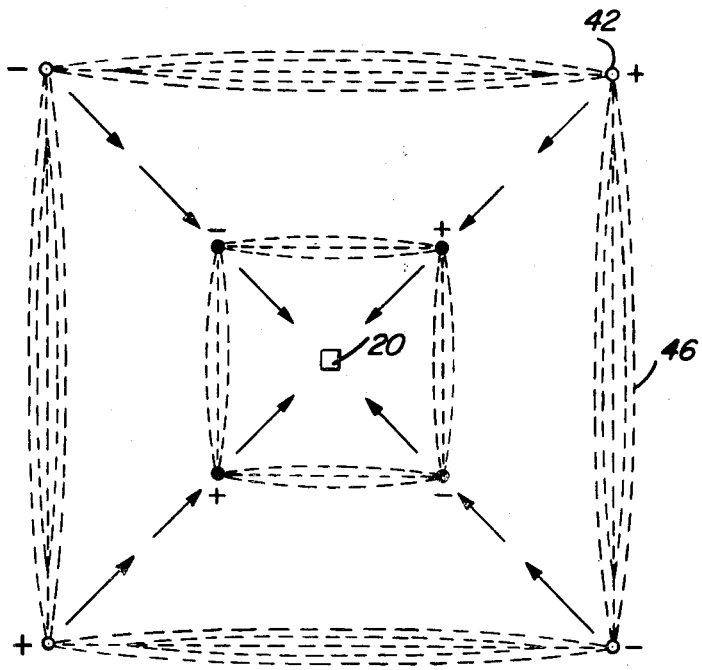
FIG. 2 is a schematic top plan view illustrating the method associated with the present invention.
Figure 3:
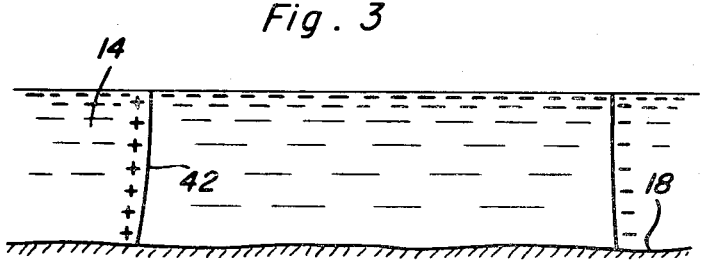
FIG. 3 is a diagrammatic side sectional view through a body of water within which the method of the present invention may be practiced.

Referring now to FIGS. 2 and 3, it will be observed that the flexible electrodes 42 are initially positioned at locations remotely spaced from the collection zone 20 so that they form the corners of a polyhedron of relatively large volume. Further, electrical energy is supplied to the electrodes 42 in the form of potentials of opposite polarity in order to establish electric fields 46 between electrodes. These electric fields form the aforementioned barriers within the water in order to prevent escape of those fish or animal life desired to be harvested.

The electric fields 46 are maintained at a constant current flow between the electrodes as the electrodes are moved radially inwardly toward the collection zone 20 and closer to each other, by appropriately reducing the voltage while the volume enclosed by the electric fields is being contracted as shown in FIG. 2. Movement of the electrodes and contraction of the volume enclosed by the electric field barriers 46, is effected by rotation of the winch 24 in a counterclockwise winding direction as viewed in FIG. 4. Thus, the floats and the electrodes suspended therefrom will move toward the collection zone until the floats abut the corner guide posts 28 outlining the collection zone as shown in FIGS. 1 and 4.

The electrodes 42 are in the form of flexible chains of a sufficient length to exceed the maximum depth of the body of water within which the method is being practiced. Thus, a variable depth body of water may be accommodated without any loss of fish. It will be furthermore appreciated, that the extent of the volume enclosed by the electric field barriers may be varied upon unwinding of the cables 32 from the winch, in order to accommodate different harvesting locations.

The collection zone 20 defined by the frame assembly 12 is particularly suitable for harvesting crayfish in shallow depth impoundments. The present invention contemplates, however, a considerably larger collection zone in deep sea installations where the equipment mounted frame is supported on the deck of a fishing vessel and the inward movement of the floats 36 is terminated some distance from the fishing vessel. Other fishing vessels may then enter the collection zone for harvesting of the fish concentrated therein. The electrical potentials applied to the electrodes may be alternating, direct current or pulsating depending on the application desired. However, as hereinbefore indicated, the current value set for a specific application is maintained constant.

Regarding the winch device 24, the individual sheaves may be rotated independently of each other when the cables are being unwound to position the electrodes at desired locations. The sheaves are interlocked when the cables 32 are being wound to reel in the electrodes toward the collection zone. Any suitable mechanism may be employed for this purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A method of harvesting fish or the like in a body of water including the steps of: floating a plurality of electrodes in positions forming corners of a polyhedron enclosing a volume of said body of water; applying electrical energy to said electrodes to establish electric field barriers therebetween; and imparting movement to said electrodes toward each other for contracting said volume enclosed by the barriers.

2. The method of claim 1 wherein the electrical energy supplied to the electrodes is regulated to maintain substantially constant current flow between the electrodes as the volume is being contracted.

3. Apparatus for harvesting fish or the like in a body of water comprising a plurality of vertically elongated electrodes, a frame assembly enclosing a collection zone, float means connected to said electrodes for support thereof at positions spaced outwardly of the frame assembly to define a volume enclosing the frame assembly, cable means extending from the frame assembly and connected to the float means for displacing the electrodes relative to each other, and means for supplying electrical energy to the electrodes while being displaced for establishing moving barriers therebetween.

4. The combination of claim 3 wherein said cable means includes a power operated winch mounted on the frame assembly, a plurality of cables interconnecting the winch with said float means, and guide means mounted by the frame assembly for engagement with the cables directing the same radially outward of the collection zone.

5. The combination of claim 4 wherein said volume constitutes a polyhedron having corners at which the electrodes are located in encircling relation to the frame assembly and the collection zone.

6. The combination of claim 3 wherein said volume constitutes a polyhedron having corners at which the electrodes are located in encircling relation to the frame assembly and the collection zone.

7. Apparatus for harvesting fish or the like in a body of water, comprising relatively stationary collection means, a plurality of spaced floats, means connecting said floats to the collection means for radial movement of the floats relative to the collection means, electrodes suspended from each of said floats in encircling relation to the collection means, and means supplying electrical energy to the electrodes for establishing a peripheral barrier of varying perimeter during movement of the floats.

* * * * *